United States Patent [19]
Bezaire

[11] Patent Number: 5,319,568
[45] Date of Patent: Jun. 7, 1994

[54] MATERIAL DISPENSING SYSTEM

[75] Inventor: Leon Bezaire, Sterling Heights, Mich.

[73] Assignee: Jesco Products Co., Inc., Sterling Heights, Mich.

[21] Appl. No.: 738,198

[22] Filed: Jul. 30, 1991

[51] Int. Cl.⁵ .................. G06F 15/46; B05C 11/00
[52] U.S. Cl. ..................... 364/479; 118/DIG. 2; 118/692; 222/55; 364/510; 364/558; 901/43
[58] Field of Search ..................... 901/41–43, 901/50; 364/479, 509, 510, 558, 172, 173; 222/52, 55, 389, 394; 118/DIG. 2, 688, 692, 50, 696–698; 137/2, 8, 12, 14, 485, 487, 487.5, 497–504; 251/129.08; 73/861.42, 861.44, 861.53–861.58, 861.62

[56] References Cited
U.S. PATENT DOCUMENTS

| | | | |
|---|---|---|---|
| 4,465,236 | 8/1984 | Calder | 239/391 |
| 4,535,919 | 8/1985 | Jameson | 222/190 |
| 4,709,858 | 12/1987 | Stern et al. | 239/296 |
| 4,787,332 | 11/1988 | Geisel et al. | 118/697 X |
| 4,852,773 | 8/1989 | Stanolick et al. | 222/504 |
| 4,858,172 | 8/1989 | Stein | 364/160 |
| 5,121,329 | 6/1992 | Crump | 364/474.24 X |

Primary Examiner—Joseph Ruggiero
Attorney, Agent, or Firm—Dykema Gossett

[57] ABSTRACT

A method and apparatus 10 are disclosed for applying a bead or strip of material 16 upon an object 18, such that the bead 16 has a desired cross-sectional area. Moreover, system 10 includes a source 30, controller 38, a dispensing apparatus 28, and a gun 14. In operation, controller 38, by controlling gun 14, ensures that a constant pressure of material is output from unit 28 to gun 14, for a variety of material flow rates from unit 28.

4 Claims, 5 Drawing Sheets

MATERIAL DISPENSING SYSTEM

BACKGROUND OF THE INVENTION

1. Field of the Invention

This invention generally relates to a material dispensing system and, more particularly, to a computerized system which places a strip or bead of material, having a substantially constant cross-sectional area upon a desired object, or is capable of selectively placing a bead if a variable cross-sectional area is required upon such an object.

2. Discussion

Dispensing systems are normally used to place several beads or strips of material, each comprising an adhesive or sealant, upon an object such as an automobile windshield or door frame assembly. It is very desirable to ensure that these material beads each have a specific and constant cross-sectional area, in order to allow the beads to cooperatively perform their desired function, while preventing material build-up, which may cause the material to flow to undesired portions of the object. This undesirable and improper material flow usually requires the object to be cleaned, thereby causing a waste of much time and resources, and may even cause the object to adhere to undesired portions of an assembly, resulting in undesirable assembly operation.

Prior dispensing systems usually include a source of material (i.e. a supply pump and metering unit), which provides a constant flow of material. The material is then directed to an applicator which is adapted to be moved in close proximity to and around the object. In order for these prior dispensing systems to apply a material bead or strip, having a constant cross-sectional area (or several beads, each having substantially similar cross-sectional areas), the applicator must be moved at a constant velocity, proportional to the rate of flow of the material emanating from the dispenser. Moreover, if a bead having a variable cross-sectional area is required, the applicator must be moved at a varying speed during bead formation.

While these prior dispensing systems have worked well for some objects, they failed to provide beads, each having a desired constant (or selectively variable) cross-sectional areas upon objects having very sharp or rounded corners or edges. This was due to the fact that the applicator is usually required to be stopped or reduced in velocity, around these sharp corners or edges. This reduction in applicator velocity causes some of the beads, or even portions of a single bead, to have irregular and undesirable cross-sectional areas, since the material flow rate is not concomitantly reduced.

One approach, used to alleviate these problems, involved stopping both the applicator and the flow of material entering the applicator, as soon as the applicator reached a very sharp corner or edge. While this approach is somewhat useful, it requires extensive software programming of the dispensing system and often results in an excessive build-up of the dispensed material in the corner or rounded edge portion of the object, or in a failure to provide needed material over some of the object portions.

Another approach, to alleviate problems associated with these prior dispensing systems, required the changing of the dispensed material flow rate to correspond to the slower applicator velocity, needed to traverse the sharp corner or edge portions of the object. This approach was found to be unsatisfactory since a change in material dispensing flow rate does not instantaneously result in a change of material flow rate at the applicator. This flow rate delay is due to the fact that a certain pressure drop is normally established between the material dispenser and the dispensing applicator, which are normally many feet apart.

When the flow rate of the dispensed material, at the dispenser, is quickly reduced to a new flow rate, the new flow rate is not observed at the applicator, until a new pressure drop is established between the material dispenser and the applicator (commonly called lead/lag). This delay is known to be caused by the distance between the tip and the dispensing unit; the viscosity of the utilized material, the compressibility of the material; the elasticity of the conduits connecting the dispenser with the applicator; and the magnitude of the rate of change in the flow rate, at the metering or dispensing unit.

Moreover, this flow rate gradient is unacceptable, since it also causes accessible build-up at the sharp corner or edge portions of the object or a failure to provide needed material over some of the object portions.

SUMMARY OF THE INVENTION

It is an object of this invention to provide a dispenser system which allows a single or multiple strips or beads of material, each having a substantially constant cross-sectional area, to be applied to the surface of an object.

It is another object of this invention to provide a dispenser system which allows a strip of material, having a constant cross-sectional area, to be applied to an object, even when the flow rate of the dispensed material changes.

It is a further object of this invention to provide a dispenser system which allows a strip or bead of material, having a variable or constant cross-sectional area, to be applied to an object, even when the material applicator is not moved at a constant velocity.

It is another object of this invention to provide a dispenser system, including an applicator having a variable material outlet orifice, and a controller coupled to the variable orifice, effective to control the position of the orifice in unison with controlled changes in the material dispensing flow rate.

It is a further object of this invention to provide a material dispensing system, including an applicator having a variable material outlet orifice, the system being adapted to measure various orifice positions and to uniquely associate flow rates with these openings, and to use the measured positions and flow rates to create a table which may be used to allow for the dispensing of a bead of material, having a substantially constant cross-sectional area, upon an object.

It is yet a further object of this invention to provide a dispensing system which allows for the dispensing of a bead of material, having a constant cross-sectional area, even during changes in the viscosity of the dispensed material.

According to the teachings of the present invention, an apparatus is provided which includes a material applicator, having a material receiving orifice through which material is received and a material outlet orifice through which material passes; and a controller, adapted to control the rate that the material is flowing to the applicator and adapted to selectively close a portion of the outlet orifice, in response to the controlled flow rate, effective to allow a bead of material to be placed upon an object, the material having a desired cross-sectional area. This desired cross-sectional area may be of a constant dimension or may be varied, as desired.

According to a second aspect of the present invention, a method is provided for receiving a flow of material and to apply a bead of material, having a constant cross-sectional area, upon an object. The disclosed methodology comprises the step of determining the rate of flow of the received material; forcing the received material to flow through a material outlet orifice; and selectively closing the orifice, in response to the determined flow rate, effective to allow the material to form a bead, having a desired cross-sectional area, upon a desired object. This desired cross-sectional area may be of a constant dimension or may be varied, as desired.

Further objects, features and advantages of the invention will become apparent from a consideration of the following description and from the appended claims, when taken in connection with the accompanying drawings.

BRIEF DESCRIPTION OF THE DRAWINGS

Various advantages of the present invention will become apparent to those skilled in the art by reading the following specification and by reference to the following drawings in which.

DETAILED DESCRIPTION OF THE INVENTION

Figure 1:
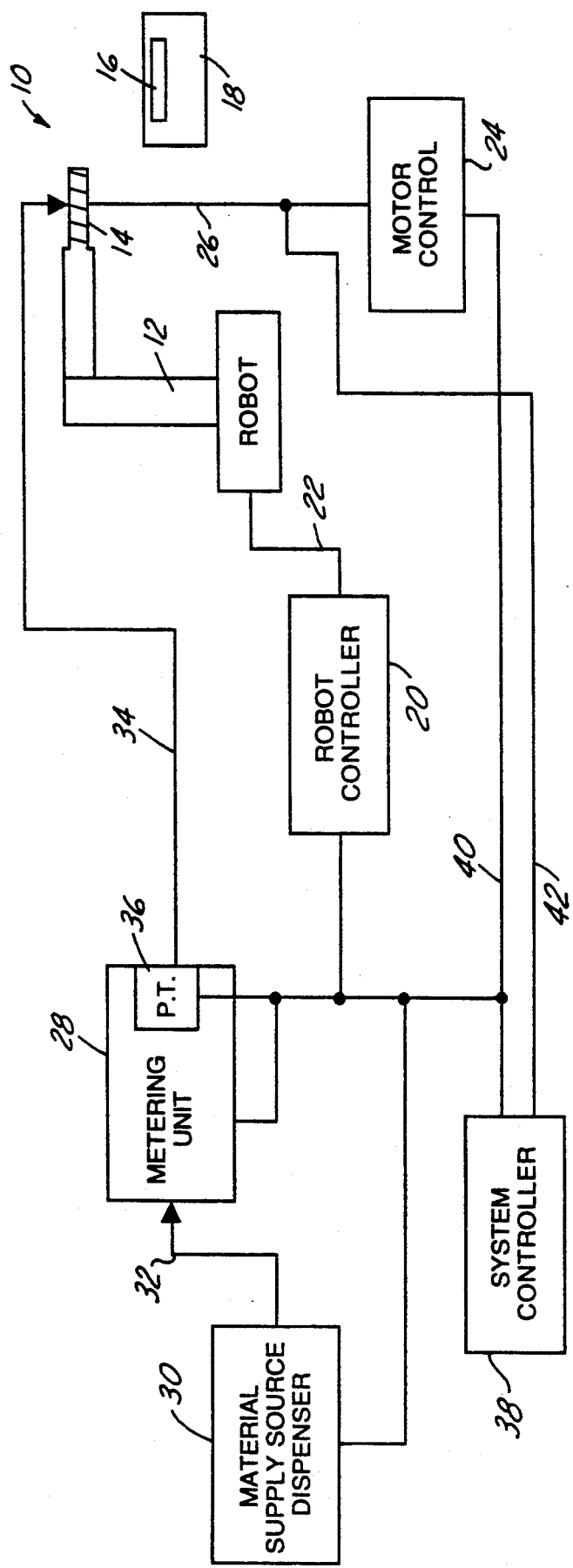
FIG. 1 is a block diagram of the apparatus and methodology of the preferred embodiment of this invention.

Referring now to FIG. 1, there is shown a material dispenser system 10, made in accordance with the teachings of the preferred embodiment of this invention. As shown, system 10 includes a robot 12 having an applicator end effector or gun 14, adapted to apply a strip or bead of material 16 upon an object 18. Robot 12 may comprise one of many types of commercially available robots. In one embodiment robot 12 comprises a model S-400 robot, manufactured by the GM Fanuc Robotics Company of Auburn Hills, Mich. System 10 also includes a robot controller 20, coupled to robot 12 by bus 22 and adapted to control the motion of robot 12 and gun 14, according to a stored software program. Moreover, system 10 also includes a motor controller 24, coupled to gun 14 by means of bus 26, and adapted to control the pressure of the material received by gun 14, in a manner which will be explained.

As further shown, system 10 also includes a material metering unit 28 which is coupled to a material supply source 30, by means of a supply conduit 32. As shown from the prior art, source 30 is adapted to contain a quantity of material, which is to be selectively applied to object 18, and is further adapted to selectively force the contained material through conduit 32, where it is received by metering unit 28. In one embodiment of this invention, material supply source 30 comprises a "DT", "DC", "PS" or similar type of pumping system, manufactured by Jesco Products Company of Sterling Heights, Mich.

Metering unit 28 is, as known in the prior art, adapted to receive the supplied material from source 30 and to actually meter the material, through conduit 34 to gun 14. These units, as is known, normally include a pressure transducer 36 which measures and transmits the amount of pressure associated with the flow of the stream of dispensed material into conduit 34. In practice, metering unit 28 may comprise an analogue flow rate dispenser, such as the Jesco Model N-1400 Series, manufactured by Jesco Products Company of Sterling Heights, Mich. This analogue flow rate dispenser could either be hydraulically driven or servo-motor driven by a unit such as the Jesco Model N-2650. Additionally, unit 28 may alternatively comprise a positive displacement gear pump, which may either be hydraulically or servo driven. If hydraulically driven, a Jesco Model N-3205 unit may be employed while if servo driven, a Jesco Model N-2905 unit may be employed. As further shown in FIG. 1, system 10 also includes a system controller 38, under stored program control and coupled to source 30, transducer 36, metering unit 28, robot controller 20, and motor controller 24, by means of bus 40. Controller 38 is also coupled to gun 14 by means of bus 42. In one embodiment, controller 38 comprises a series DMC-700 controller manufactured by the Galil Company, located at 575 Maude Court, Sunnyvale, Calif.

Figure 2:
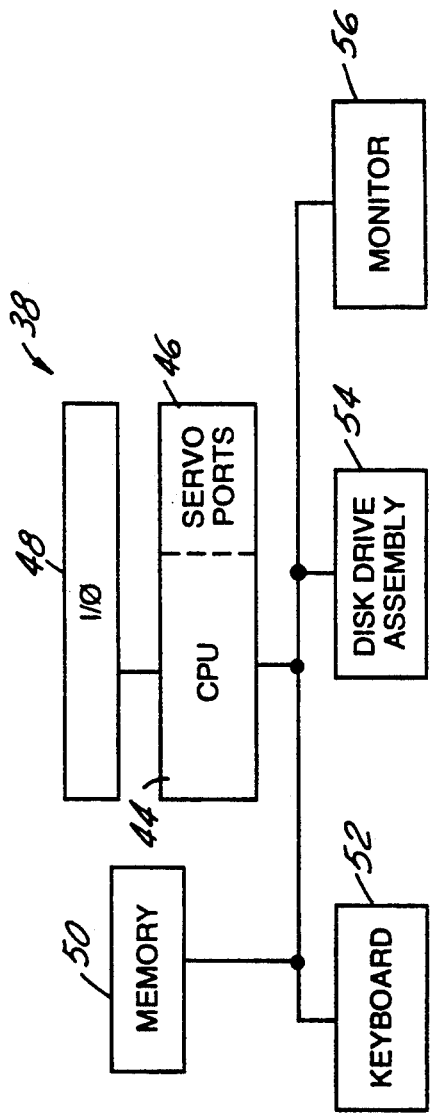
FIG. 2 is a block diagram of the system controller, shown generally in FIG. 1, and made in accordance with the teachings of the preferred embodiment of this invention.

Referring now to FIG. 2, system controller 38 is shown to include a central processing unit 44, having several servo ports 46 and coupled to an input/output assembly 48. Further, controller 38 includes a memory portion 50, adapted to selectively store certain data, and a keyboard 52, effective to allow a user to communicate with or control the stored program contained within controller 38. Moreover, controller 38 also may include (in one embodiment) a disk drive assembly 54, adapted to allow data storage disks containing the stored program associated with the preferred embodiment of this invention, to be input to central processor 44 and stored within memory 50, for later use by processor 44. Lastly, controller 38 includes a monitor 56 which allows data to be selectively displayed to a user of a system. As shown, memory 50, keyboard 52, disk drive assembly 54, and monitor 56 are coupled to central processor 44 by bus 55. Before discussing the operation of central processor 44, and the operation of the stored program control which it contains, it will be necessary to discuss the operation of the dispensing gun or end effector 14.

Figure 3:
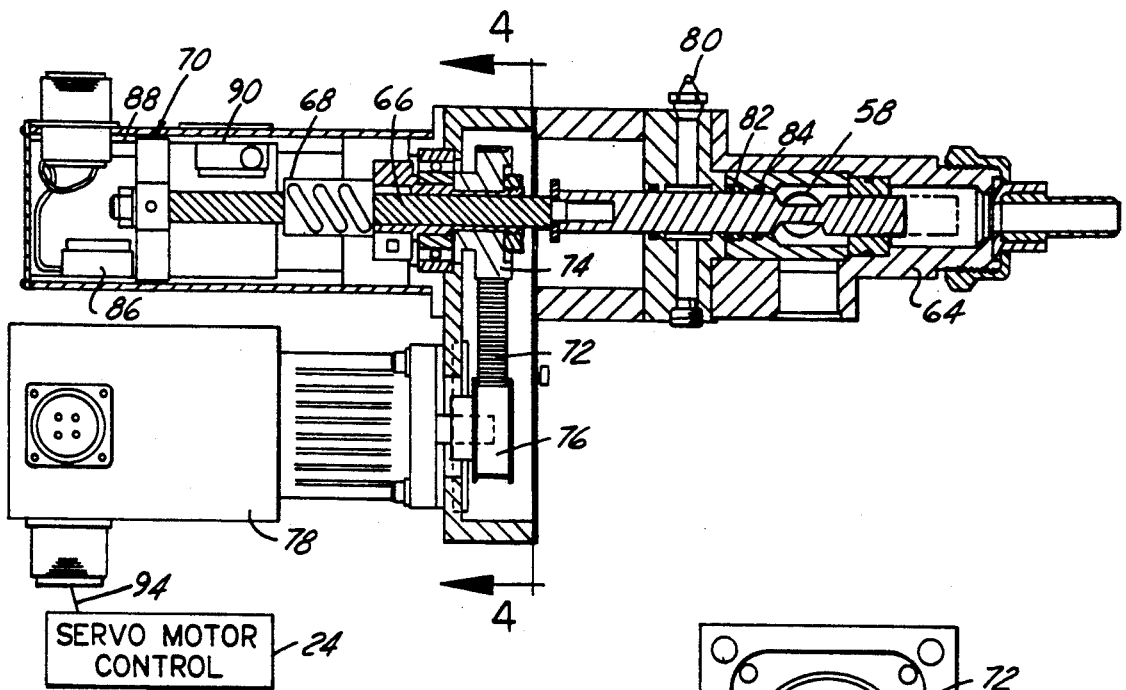
FIG. 3 is a partial cross-sectional view of the material applicator end effector, shown generally in FIG. 1, and made in accordance with the teachings of the preferred embodiment of this invention.
Figure 4:
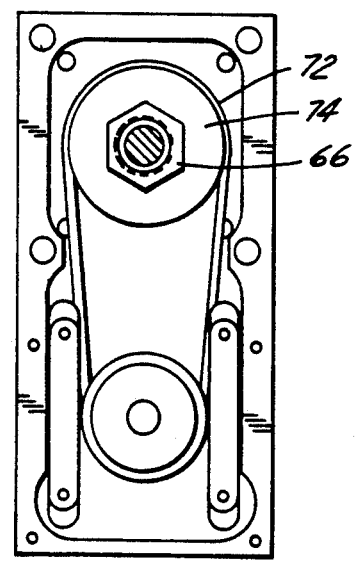
FIG. 4 is a view of the end effector, shown in the FIG. 3, taken along line a—a.
Figure 5:
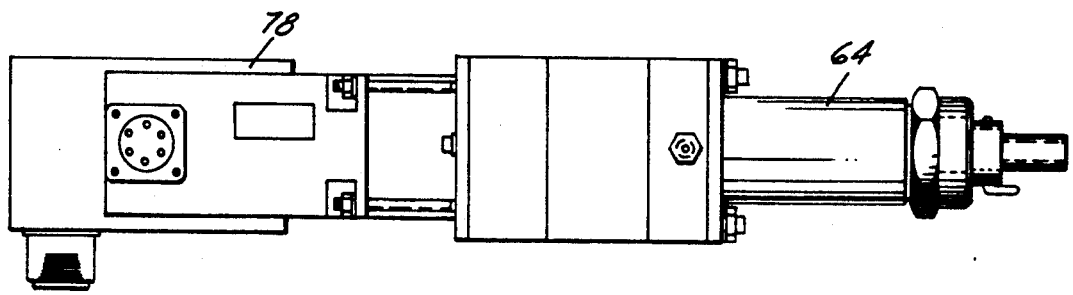
FIG. 5 is a top view of the end effector, shown generally in FIG. 3, and made in accordance with the teachings of the preferred embodiment of this invention.

Accordingly, reference is now made to FIGS. 3, 4, and 5, showing gun 14. Specifically, gun 14 includes a material inlet port 59 which is releasably coupled to conduit 34 and which allows the material, emanating from unit 28, to be received and to pass through outlet orifice 58, before being selectively applied to object 18. Further, gun 14 includes a piston 62, reciprocally movable within casing 64, and adapted to close a selectable portion of orifice 58, thereby defining the pressure of the material entering into and applied from gun 14. It should be apparent, that the closing of orifice 58 causes pressure to increase in conduit 34 while opening orifice 58, causes this pressure to decrease.

As shown, piston 62 is coupled to a screw 66 which is coupled to a ball-nut assembly 68. Assembly 66 is coupled to a travel bar 70 which prevents assembly 66 from rotating within casing 64, but allows the assembly 66 to translate within gun 14. Moreover, ball-nut assembly 68 is also coupled to a timing belt 72, movably arranged around pulleys 74 and 76. Pully 76 is movably coupled to a motor 78.

In operation, motor 78 rotates pully 76 which in turn, causes pully 74 to impart rotational energy to assembly 68. Travel bar 70 prevents screw 66 from rotating. Screw 66 is therefore made to move piston 62 in a translational manner within casting 64, in response to the rotational energy. In this manner, piston 62 is moved to a predetermined position with respect to the material outlet orifice 58, and acts to control the pressure of the received material, to be received by and to be output from gun 14. This position may vary from the "full" open position (shown in phantom) to the "full" closed position, as shown.

Additionally, and as best shown in FIG. 3, gun 14 further includes a wet seal 80 which lubricates the piston 62 and prevents curing of any material formed upon the piston 62. Further, gun 14 includes seals 82 and 84 which cooperate to substantially prevent material from entering the screw and assembly portion of gun 14, in order to prevent damage to these components. Moreover, seals 82 and 84 both wipe the shaft of piston 62 before the piston goes back into a closed material flow position, so as to further to prevent the leakage of any contaminants within the pressure cavity.

Figure 7:
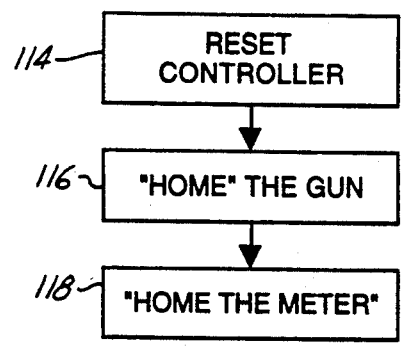
FIG. 7 is a flow chart comprising a sequence of steps, associated with the "initialize" step of the flow chart shown in FIG. 6.

Further, and as also best shown in FIG. 3, gun 14 includes proximity switches 86, 88, and 90 which are coupled to controller 38, by means of bus 42, and are used in the "home" step of the flowchart shown in FIG. 7. The use of switches 86, 88, and 90 will be explained. Additionally, motor 78 is also coupled to servo motor control assembly 24, by means of bus 94. As earlier explained, assembly 24 is coupled to controller 38, by means of bus 40, and provides the position or amount of opening associated with material outlet orifice 58, to the controller 38. In one embodiment of this invention, motor 78 and assembly 24 may comprise a Bru-200 series motor power controller and servo assembly, manufactured by the Electro Craft Company, having a place of business at 1600 Second Street South, Hopkins, Minn. 55343.

Figure 6:
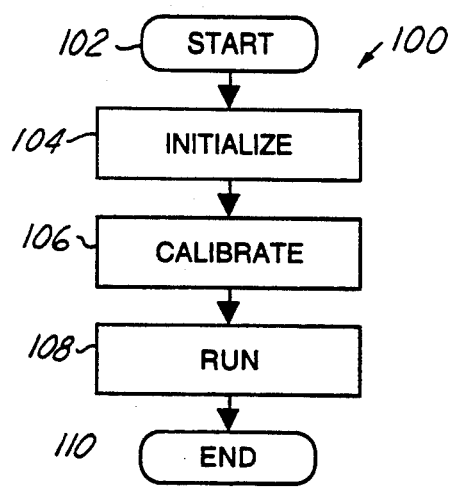
FIG. 6 is a flow chart comprising a sequence of steps, associated with the operation of the system controller, shown generally in FIGS. 1 and 2, and made in accordance with the teachings of the preferred embodiment of this invention.

Referring now to FIG. 6, there is shown a flowchart 100, comprising a sequence of steps associated with the stored program operation of controller 38. Specifically, flowchart 100 includes an initial start step 102 in which the stored program, associated with the preferred embodiment of this invention, begins to take control of controller 38. Step 102 is followed by step 104 in which system 10 is initialized. Step 106 follows step 104 and, in this step the system is calibrated, in accordance with the methodology of the preferred embodiment of this invention. Step 106 is followed by step 108 in which a "run" mode is activated and during which a strip or bead of material is dispensed upon object 18, such that the material is of a desired cross-sectional area, which may be of a selectively varied or of a constant size or shape. Step 108 is followed by step 110, which designates the end of the dispensing cycle. To more fully understand the operation of the preferred embodiment of this invention, attention is now drawn to FIG. 7, having a flowchart 112 and comprising a sequence of steps associated with "initialize" step 104, of flowchart 100.

Specifically, flowchart 112 includes a initial step 114 in which any and all errors associated with past "run" modes is deleted, from controller 38. Step 116 follows 114 and, in this step, gun 14 is "homed". That is, piston 62 is made to occupy a position such that it fully closes material outlet orifice 58, as shown in FIG. 3. In this fully closed position, no material is allowed to exit through orifice 58 and therefore, no material is applied to object 18. This "home" position is detected by proximity sensor 88 and transmitted to controller 38, by means of bus 42. Additionally, if piston 62, and more particularly, assembly 70 and 66 were to be moved further back within gun 14, potentially causing damage to the gun, such movement would be detected by sensor 86. This information would then be sent to controller 38, by means bus 42. After receipt of this information, controller 38 is adapted to cause motor 78 to be de-activated, by transmitting a "disconnect" command to controller 24, by means of bus 40. Lastly, should piston 62 be moved too far away from orifice 58, thereby potentially causing damage to gun 14, such movement would be detected by proximity sensor 90. This information would then be sent to controller 38, by means of bus 42. After receipt of this information, controller 38 is adapted to cause motor 78 to be de-activated, by transmitting a "disconnect" command to controller 24, by means of bus 40.

Figure 8:
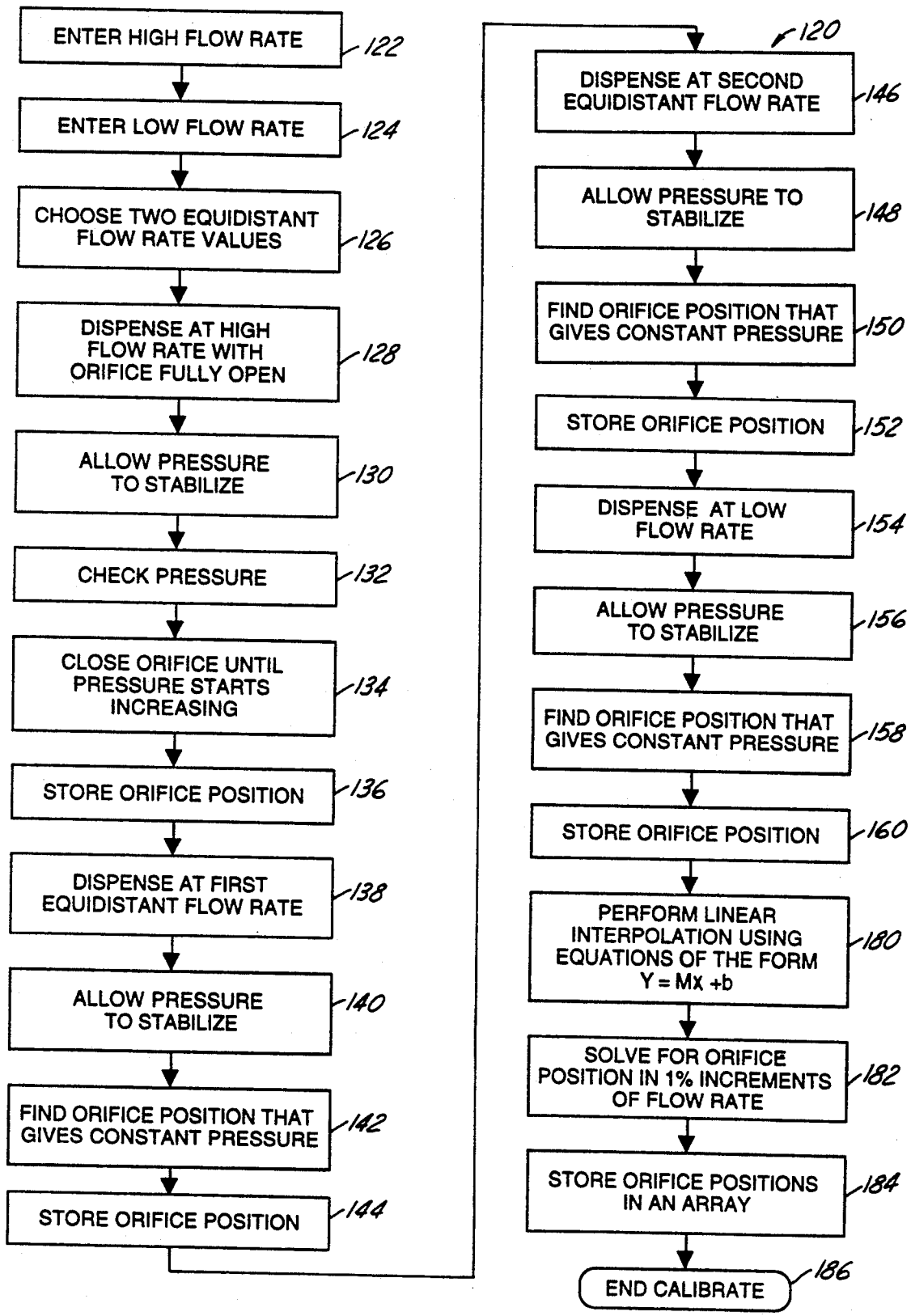
FIG. 8 is a flow chart comprising a sequence of steps associated with the "calibrate" step of the flow chart shown in FIG. 6.

Step 116 is followed by step 118 and, in this step, meter 28 is "homed" or placed into an initial material dispensing position, as is known in the prior art. After steps 114, 116, and 118 are complete, calibrate step 106 is initiated. To fully understand the operation of the "calibration" portion of this invention, reference is now made to FIG. 8, comprising flowchart 120.

Specifically, flowchart 120 includes an initial step 122 in which a user enters the highest material flow rate that is required from the metering unit 28. Step 122 is followed by step 124 in which the user enters the lowest flow rate, associated with metering unit 28.

Step 126 follows step 124 and, in this step, controller 38 is made to choose two equi-distant rate values, lying between the highest flow rate (associated with step 122) and the lowest flow rate (associated with step 124). Step 128 follows step 126 and, in the step, controller 38 causes the unit 28 to dispense material at the highest flow rate and sends a signal to motor controller 24 so as to allow piston 62 to move toward a position in which orifice 58 is fully open. Step 130 follows step 128 and, in the step, controller 38 monitors the signal generated from transducer 36 and determines when the pressure within conduit 34 has stabilized. After this time is elapsed, step 130 is followed by step 132 in which controller 38 reads the pressure signal emanating from pressure transducer 36, by means of bus 40, and stores the pressure value within memory 50. After reading this pressure, controller 38 enters step 134 where the controller generates a signal to the motor controller 24 so as to close orifice 58, by discretely moving piston 62 back, by means of screw 66, in selectable steps. At each discrete step of piston 62, controller 38 checks the pressure signal, emanating from transducer 36. The movement is completed when the pressure starts increasing above the value stored in step 132. The piston position which is previous to the position causing this undesired pressure increase, is stored within memory 50, in step 136.

Step 13 is followed by step 138, and, in the step, gun 14 is made to dispense material at the first selected equi-distant flow rate. Step 138 is then followed by step 140 in which a second time lapse is made to occur, in order to allow the pressure within conduit 34 to stabilize.

Step 142 follows step 140 and, in the step, controller 38, transmits signals to motor controller 24, effective to discretely move piston 62 to various positions. At each piston position, controller 38 monitors the pressure signal emanating from transducer 36. In this manner, the exact orifice position that gives the pressure associated with step 132 is found. This orifice position is stored within memory 50, in step 144.

Step 146 follows step 144, and in the step, controller 38 causes metering unit 28 to dispense material at the second selected equi-distant flow rate. Step 148 follows step 146 and, in the step, a third time lapse is made to occur such that the pressure is made to stabilize within conduit 34. Step 148 is followed by step 150, in which controller 38 sends signals to servo control 24 to force piston 62 to discretely move within casing 64. As before, at each piston position, controller 38 measures the pressure within conduit 34. When a pressure is obtained, within conduit 34, corresponding to the pressure associated with step 132, all further piston movement stops. The orifice position associated with this pressure is stored within memory 50, in step 152.

Step 152 is then followed by step 154 in which controller 38 causes metering unit 28 to dispense material at the lowest selected flow rate. Step 154 is then followed by step 156 in which a fourth time period is allowed to elapse in order to allow the pressure, within conduit 34, to stabilize. It should be realized, by one of ordinary skill in the art that all of the time periods or lapses will vary in length depending upon the type of material dispensed from dispenser 30 and the utilized flow rate. Moreover, by constantly monitoring the pressure within conduit 34, an efficient determination of pressure stability may be achieved thereby shortening this time delays.

Step 156 is followed by step 158 and, in this step, controller 38 forces motor controller 24, to position piston 62 at several discrete positions, within casing 64. At each position controller 38 measures the pressure within conduit 34. All movement stops when a pressure, substantially equal to that of step 132, is found. The corresponding orifice position is stored in memory 50, in step 160 and all dispensing is stopped.

Figure 9:
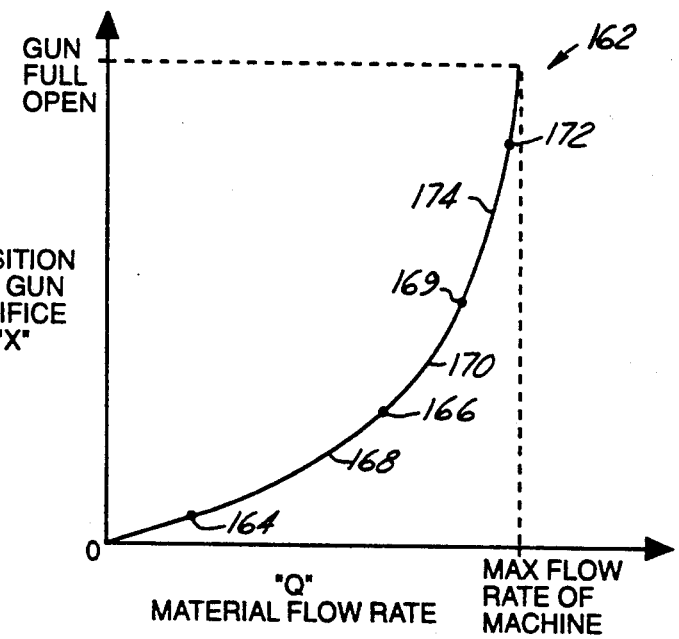
FIG. 9 is a graph showing the relationship between various material flow rates and orifice positions, obtained from the "calibrate" step, of the flow chart shown in FIG. 6.

These associated orifice positions and flow rates are shown in graph 162, of FIG. 9. As shown, the low flow rate 164 and lowest equi-distant flow rate 166 define a line 168, having a rather non-linear shape. Similarly, the highest equi-distant flow rate 169 and the lowest equi-distant flow rate 166 also defined a non-linear line 170, therebetween. Lastly, the highest flow rate 172 and the highest equi-distant flow rate 169 also define a non-linear line 174, therebetween.

In order to make use of this calibrated data, step 180 follows step 160 and requires that separate interpolations be made between points 164 and 166; between 166 and 169; and between points 169 and 172, using equations, in one embodiment, of the form $Y=Mx+b$, where "y" designates orifice position and "x" designates flow rate. Step 182 follows 180 and, in the step, the equations are solved for the orifice position in 1% increments of the flow rate. It should be apparent to one of ordinary skill in the art, that other selectable incrementation steps may be used by this invention and that the exact shape of lines 168, 170, and 174 will vary depending upon the type of material, the utilized flow rates, and the design shape of the adjustable orifice 58 of gun 14.

Step 184 follows 182 and in this step, the orifice positions, which have been solved by interpolation, are stored in an array, residing within memory 50. Step 186 follows step 184 and designates the end of the calibrate routine. In this manner, one of ordinary skill in the art should realize that a table of orifice positions associated with each of the useable flow rates of system 10 may be developed and used within system 10 so as to allow for a relatively constant pressure output from metering unit 28. In this manner, the robot may vary the velocity of dispensing gun 14, such as around a sharp corner or bend, while continuing to apply a bead of relatively constant cross-sectional area, or to purposely change the flow rate of material emanating from unit 28 while maintaining a constant applicator speed in order to purposely vary the cross-sectional area of the bead. The actual operation of this system is more fully shown in flow chart 200 of FIG. 10.

Figure 10:
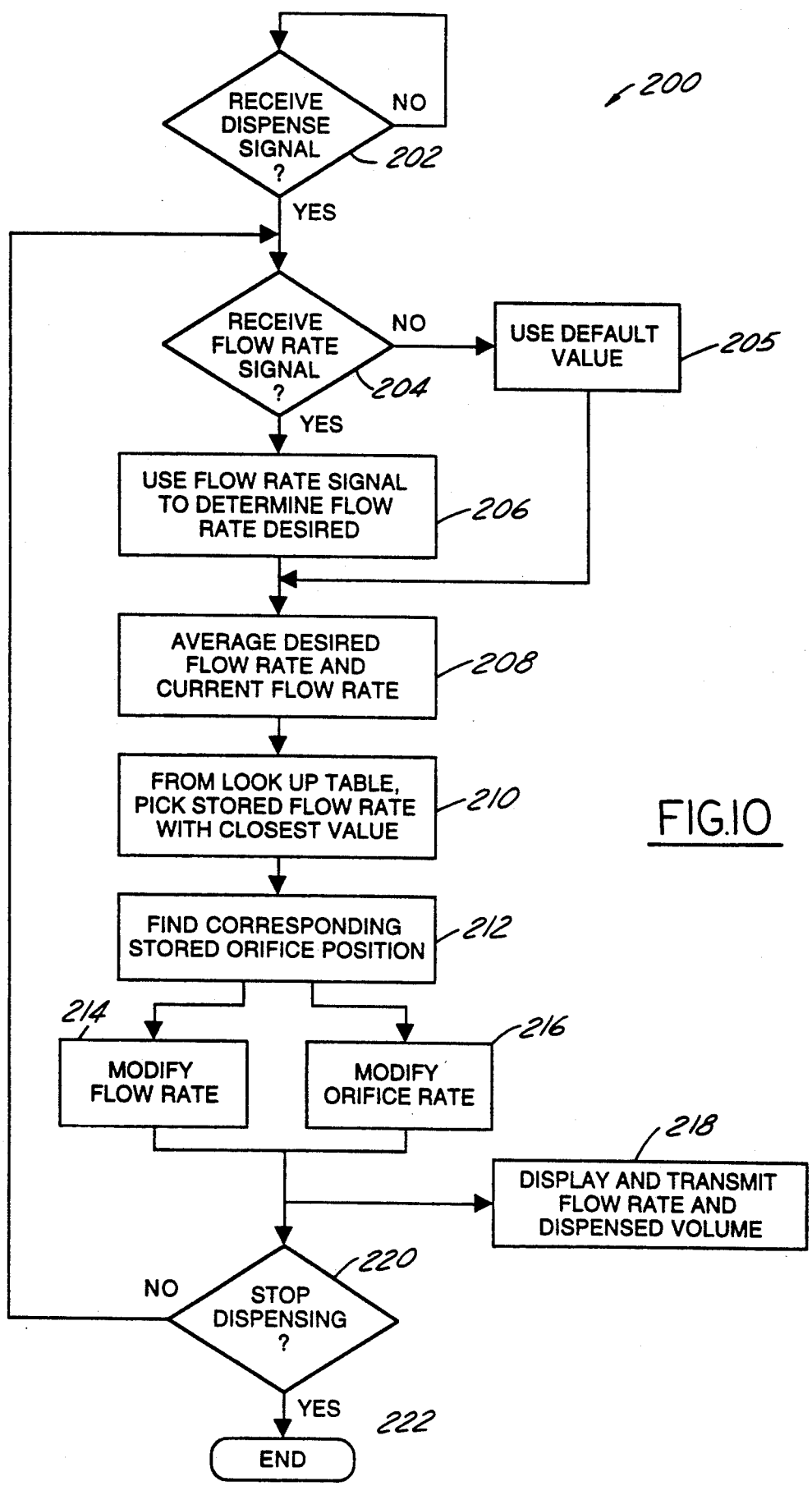
FIG. 10 is a flow chart comprising a sequence of steps associated with the "run" step of the flow chart shown in FIG. 6.

As shown in FIG. 10, flow chart 200 includes an initial step 202 which requires controller 38 to determine if a dispense signal has been received from robot controller 20, through bus 40. Controller 38 remains in a state, defined by step 202, until such a dispense signal has been received. Step 202 is then followed by step 204, which requires controller 38 to determine if a flow rate signal, emanating from robot 20, has been received. This signal, received along bus 40, is used by controller 38 to determine the rate of material flow required during system operation. If such a signal has not been received (or if the received signal is higher than the highest flow rate of step 122 or lower than the lowest flow rate of step 124), step 204 is followed by step 205 in which controller 38 uses a predetermined and desired flow rate. This may be either the previously specified highest or lowest rate or some other desired value. Step 204 is followed by step 206 which requires controller 38 to use the flow rate signal to determine the desired flow rate. That is, this received flow rate signal usually comprises a current in the 0 to 20 milli amp range or a voltage in the 0 to 5 to 0 to 10 volt range. These electrical ranges are then scaled, by prior known means, to allow the controller 38 to determine the exact flow rate desired.

Step 206 and step 205 are both followed by step 208, which requires controller 38 to average the desired flow rate with the current flow rate. That is, controller 38 will not use the desired or newly received flow rate, in order to reduce system errors. Rather, this desired flow rate is added to the current flow rate, and this sum is halved.

Step 208 is followed by step 210 which requires controller 38 to look up, within the previously stored array, the flow rate having the closest value to the calculated averaged flow rate associated with step 208. Step 210 is then followed by step 212, which requires controller 38, to utilize the previously stored array, to find the uniquely corresponding orifice position, associated with the flow rate of step 210. It should be appreciated that in an alternate embodiment, steps 182 and 184 may be eliminated and that controller 38 may simply solve for the equations of step 180, in steps 210 and 212. In so solving these equations, a corresponding orifice position may be realized.

In the preferred embodiment of this invention, step 212 is simultaneously followed by steps 214 and steps 216, which respectively requires controller 38 to substantially and simultaneously modify the flow rate, in accordance with the flow rate produced by step 210, and to modify the orifice position, corresponding to the position found in step 212. Controller 38 causes metering unit 28 to dispense material at this new rate, by means of bus 40. The orifice position is modified by the emanation of control signals, from controller 38, which are received by controller 24, through bus 40. Controller 24 then modifies the position of piston 62, within casing 64, to keep the pressure output at metering unit 28 constant. Specifically, this position is defined in step 212. Steps 214 and 216 are substantially simultaneously followed by step 218 which requires controller 38 to display the current flow rate and dispensed volume, upon monitor 56, and to transmit this information, if desired, to an external device, by means of input/output portion 48.

Step 218 is then followed by step 220, which requires controller 38 to determine if dispensing is to stop. If dispensing is not to stop, step 220 is followed by step 204. Alternatively, step 220 is followed by step 222, which defines the end of the "run" mode. It should be realized that the ascertainment required by step 220 is accomplished, by controller 38, by means of communication with robot controller 20. It should also be realized by one of ordinary skill in the art, that the maintenance of a substantially constant pressure throughout a variety of material flow rates allows the gun 14 to slow down over a very sharp corner or turned edge such that material may be deposited upon the sharp corners or edges, having a substantially constant and desired cross-sectional area. Alternatively, the bead may have an intentionally varied cross-sectional area. Moreover, it should be realized that if this pressure output at metering unit 28 remains constant, the viscosity of the dispensed material may change without disturbing or eliminating the constant cross-sectional area of the dispensed bead.

That is, referring again to FIG. 9, it has been discovered, and is part of the preferred embodiment of this invention that a change in material viscosity will not detrimentally impact the operation of system 10. In essence, the viscosity change forces the pressure, at the output of metering unit 28, to be at a lower or higher constant pressure, then was previously used. This change in pressure does not prevent or impair the dispensing of beads of material, each having a constant or desirably changing cross-sectional area upon an object, even if the material is dispensed at dissimilar flow rates around or upon object 18, since the pressure output from unit 28 remains constant, as the flow rate changes.

Figure 11:
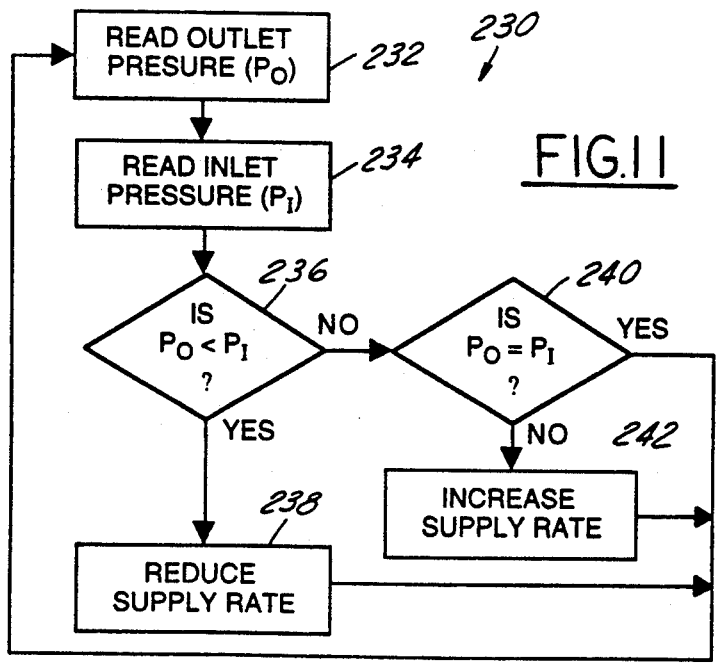
FIG. 11 is a flow chart comprising a sequence of steps associated with the use of a pump type metering unit, shown generally in FIG. 1, and made in accordance with the teachings of the preferred embodiment of this invention.

Referring now to FIG. 11, there is shown a flow chart 230 associated with controller 38 and used by the stored program of the preferred embodiment of this invention, when the metering unit 28 is of a gear pump type. That is, flow chart 230 includes an initial step 232 which requires controller 38 to read the pressure at the output of metering unit 28, by means of pressure transducer to 36. Step 232 is then followed by step 234, requiring controller 38 to read the pressure at the input or inlet port of metering unit 28, by means of another pressure transducer (not shown) or, alternatively, by means of pressure transducer 36.

Step 234 is followed by step 236, which requires controller 38 to determine whether the inlet pressure (associated with step 234) is greater than the outlet pressure (associated with step 232). If the inlet pressure is greater, step 236 is followed by step 238, which requires controller 38 to reduce the rate of material supply, emanating from supply 30. This reduction is accomplished by a means of a control signal, emanating from controller 38 and placed upon bus 40.

Alternatively, step 236 is followed by step 240 which requires controller 38 to determine whether the pressures respectively read in steps 232 and 234 are equal. If these pressures are not equal, step 240 is followed by step 242, which requires controller 38 to increase the rate of material supplied by supply 30. This rate increase is achieved by the emanation of control signals from controller 38, upon bus 40. Alternatively, step 240 is followed by step 232. Further, as shown, steps 238 and 242 are also followed by step 232. In this manner, a substantially constant pressure is placed upon metering unit 28 and ensures that beads of substantially constant cross-sectional area are placed upon object 18.

It is to be understood that the invention is not limited to the exact construction or method illustrated as described above, but that various changes and modification may be made without departing from the spirit and scope of the invention as defined in the following claims.

I claim:

1. A material dispenser adapted to receive a pressurized stream of material, having a variable flow rate and to apply several separate portions of said received material to an object, said dispenser comprising:

applicator means, having a material reception orifice adapted to receive said stream of said material and to output said received material through an outlet orifice of variable size, for applying said separate portions of said received material to the surface of said object; and control means, coupled to said applicator means and under stored program control, for forcing said flow rate to be substantially equal to a first flow rate value and for measuring a first pressure of said stream of material when said stream is made to flow at a rate substantially equal to said first flow rate value and for selectively changing said flow rate of said stream of material to a second flow rate value and for varying said size of said material outlet orifice in order to ensure that the pressure of said stream of material, flowing at a rate substantially equal to said second flow rate value, is substantially equal to said first pressure whereby, each of said applied material portions are made to be substantially similar.

2. A material dispensing system comprising:

dispensing means for receiving a quantity of material and for outputting a stream of said received material, at a certain selectable flow rate therefrom;

application means for receiving said stream of material at a certain pressure and for applying certain portions of said material to an object;

robot means, coupled to said application means, for moving said application means in a predetermined pattern, in close proximity to said object, effective to allow said application means to apply said certain portions of said material to said object and for outputting a signal representing a selected flow rate of said stream of material;

control means, coupled to said robot means, to said application means, and to said dispensing means, for receiving said selected flow rate signal and for forcing said dispensing means to output said stream of material at said selected flow rate and for causing said certain pressure to remain constant whereby, each of said applied portions are made to be substantially similar.

3. A material dispensing system as recited in claim 2, wherein said application means includes a material outlet orifice of variable size.

4. A material dispensing system as recited in claim 3, wherein said control means for causing said certain pressure to remain constant, under stored program control, includes means for varying said size of said material outlet orifice to maintain said certain pressure at said selected flow rate.

* * * * *